(12) United States Patent
Boutros et al.

(10) Patent No.: US 8,494,287 B2
(45) Date of Patent: Jul. 23, 2013

(54) CHARACTER IDENTIFICATION THROUGH GLYPH DATA MATCHING

(75) Inventors: Philip Boutros, Long Grove, IL (US);
Joseph E. Keslin, Munster, IN (US);
Thomas Chwojko-Frank, Kirkland, WA (US)

(73) Assignee: Oracle International Corporation, Redwood Shores, CA (US)

( * ) Notice: Subject to any disclaimer, the term of this patent is extended or adjusted under 35 U.S.C. 154(b) by 566 days.

(21) Appl. No.: 12/698,650

(22) Filed: Feb. 2, 2010

(65) Prior Publication Data

US 2011/0188761 A1    Aug. 4, 2011

(51) Int. Cl.
*G06K 9/68* (2006.01)
*G06K 9/00* (2006.01)
*G06K 9/62* (2006.01)

(52) U.S. Cl.
USPC ........... 382/218; 382/181; 382/219; 382/217; 382/209

(58) Field of Classification Search
USPC ....................................................... 382/181
See application file for complete search history.

(56) References Cited

U.S. PATENT DOCUMENTS

| 2004/0207627 | A1* | 10/2004 | Konsella et al. | 345/471 |
|---|---|---|---|---|
| 2006/0171588 | A1* | 8/2006 | Chellapilla et al. | 382/185 |
| 2007/0192687 | A1* | 8/2007 | Simard et al. | 715/523 |
| 2010/0290711 | A1* | 11/2010 | Gurcan et al. | 382/232 |

OTHER PUBLICATIONS

Probets, S. G. et al. "Substituting outline fonts for bitmap fonts in archived PDF files", May 22, 2001, (19 pages);.
"Glyph", published by Adobe Developer Connection, OpenType Technology Center, believed to be prior to 2007, (5 pages), downloaded from http://www.adobe.com/devnet/opentype/archives/glyph.html.

* cited by examiner

*Primary Examiner* — Jason M. Repko
*Assistant Examiner* — Jhere Rowland
(74) *Attorney, Agent, or Firm* — Silicon Valley Patent Group LLP; Omkar Suryadevara

(57) ABSTRACT

Approaches for enabling a computerized entity to recognize characters in an electronic document. In a persistent data store, character identification data is stored. Character identification data is data that, for one or more characters of one or more fonts, associates (a) glyph data for a character with (b) code point data for the character, where the glyph data describes how to render the character on or to an output device, and the code point data identifies, to the computerized entity, the identity of the character. Upon determining that an embedded font document, such as a PDF document, does not include a set of code point data for a particular character, the character identification data is consulted to determine the identity of the particular character. In this way, a machine can recognize characters in the embedded font document and perform functions such as indexing or searching on the embedded font document.

21 Claims, 6 Drawing Sheets

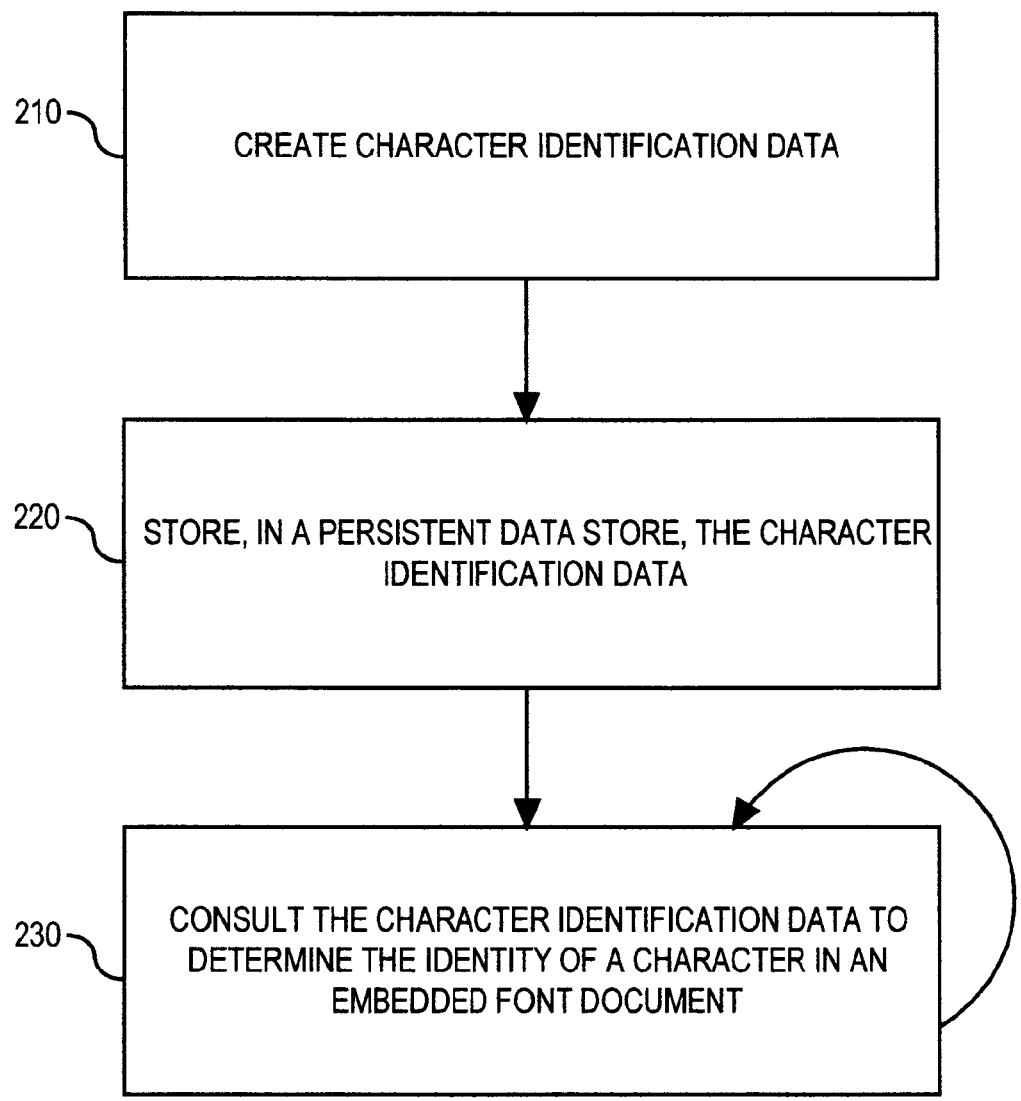

FIG. 3

| HASH VALUE OF GLYPH DATA FOR A CHARACTER | CODE POINT DATA FOR THE CHARACTER |
|---|---|
| HASH VALUE 1 | CODE POINT DATA 1 |
| HASH VALUE 2 | CODE POINT DATA 2 |
| HASH VALUE 3 | CODE POINT DATA 3 |
| HASH VALUE 4 | CODE POINT DATA 4 |
| HASH VALUE 5 | CODE POINT DATA 5 |
| HASH VALUE 6 | CODE POINT DATA 6 |
| HASH VALUE 7 | CODE POINT DATA 7 |
| HASH VALUE 8 | CODE POINT DATA 8 |
| HASH VALUE 9 | CODE POINT DATA 9 |
| HASH VALUE 10 | CODE POINT DATA 10 |

CHARACTER IDENTIFICATION THROUGH GLYPH DATA MATCHING

FIELD OF THE INVENTION

The present invention relates to enabling a computerized entity to recognize characters of an electronic document.

BACKGROUND OF THE INVENTION

Certain types of electronic document formats, such as the portable document format (PDF) by Adobe Systems, Inc. of San Jose, Calif., allow an electronic document to include all the fonts necessary to correctly display, print, or otherwise render the electronic document. When a font is included in this manner in an electronic document, the font is referred to as an "embedded font," and the electronic document containing the embedded font is referred to as an "embedded font document." Embedded fonts are helpful in that they enable a computer to correctly display, print, or otherwise render the embedded font document even if the computer itself does not possess the fonts necessary to do so. For example, a tax form available for download from the Internal Revenue Service (IRS) web site may include a "tax form" embedded font to ensure anyone who downloads the tax form will be able to view and print the tax forms correctly. Even if the person downloading the tax form does not have the "tax form" font on his or her machine, the person downloading the tax form will be able to view and print the tax form correctly since the "tax form" font is included within the embedded font document.

A drawback to embedding fonts within electronic documents is that the embedded font information can greatly increase the size of an embedded font document. For example, by embedding a font into an electronic document, the size of the embedded font document can easily double or triple. To address this issue, some formats that can include embedding fonts, such as the portable document format (PDF), allow an embedded font document to include only the font information for the specific characters that are recited within the embedded font document. For example, an embedded font document configured according to the portable document format (hereafter a "PDF document") that contains just the text "ABC" could include only the font information for the characters "A," "B," and "C," but would not contain font information for any other characters of the alphabet. This process, called font subsetting, greatly reduces the impact of embedded fonts on the size of embedded font documents.

The font information stored for each character in an embedded font document is composed of two separate types of data, referred to herein as glyph data and code point data. Glyph data is data that describes or represents the shape of a character. Computers and other computerized devices use glyph data to enable them to render a character on or to an output device. For example, a computer would use glyph data to visually depict a character on a display or to issue a command to print the character to a printer. Other the other hand, code point data is data that enables a computer or computerized entity (such as a search engine) to understand that the glyph data, associated with the code point data, represents a certain character. Generally speaking, a computer cannot "read" an electronic document by looking at the visual appearance of a document like a human would, and so a computer uses code point data to determine the identity of a particular character.

A current problem in the art is that certain software programs may create embedded font documents that include glyph data, but not the corresponding code point data, for one or more characters in a subsetted font included within the embedded font document. In this situation, the embedded font document would look completely normal and accurate to a human viewer when printed or rendered on a display because the characters in the embedded font document are visually correct. However, a computer would not be able to "read" any characters in the embedded font document for which code point data is not included in the embedded font document. As a result, such embedded font documents may not be correctly indexed, searched, or used by any software or computerized entity that needs the text of the embedded font document in a machine readable form.

SUMMARY OF EMBODIMENTS OF THE INVENTION

Techniques are provided for enabling a computerized entity to recognize characters of an electronic document. In a persistent data store, character identification data is stored. Character identification data is data that, for one or more characters of one or more fonts, associates (a) glyph data for a character with (b) code point data for the character, where the glyph data describes how to render the character on or to an output device, and the code point data identifies, to the machine, the identity of the character. Character identification data may be used by applications to identity characters within an embedded font document that lacks code point data for those characters.

Embodiments of the invention may create, update, store, and represent character identification data in a variety of different ways. For example, in an embodiment, character identification data may be created by using a hash function to obtain a hash value of the glyph data associated with a particular character of a particular font. That hash value may then be associated or mapped to a set of code point data for that particular character of the particular font. Character identification data may include any number of such associations or mappings between hash values and sets of code point data. Additionally or alternatively, embodiments of the invention may enable a user to use a user interface to indicate what character is associated with a particular set of glyph data, and subsequently the character identification data may be updated to reflect the user's identification.

Upon determining that an embedded font document, such as a PDF document, does not include a set of code point data for a particular character, the character identification data may be consulted by a computerized entity to determine the identity of the particular character. In this way, computerized entities may recognize characters recited by an embedded font document which lacks proper code point data for those characters, and may thus perform functions on the text of the embedded font document, such as indexing or searching.

Embodiments discussed in this section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2 is a flowchart illustrating the steps of enabling a computerized entity to recognize characters of an embedded font document according to an embodiment of the invention; and FIG. 3 is a graphical depiction of character identification data according to an embodiment of the invention.

DETAILED DESCRIPTION OF THE INVENTION

Approaches for enabling a computerized entity to recognize characters of an electronic document are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

ARCHITECTURE OVERVIEW

Figure 1A:
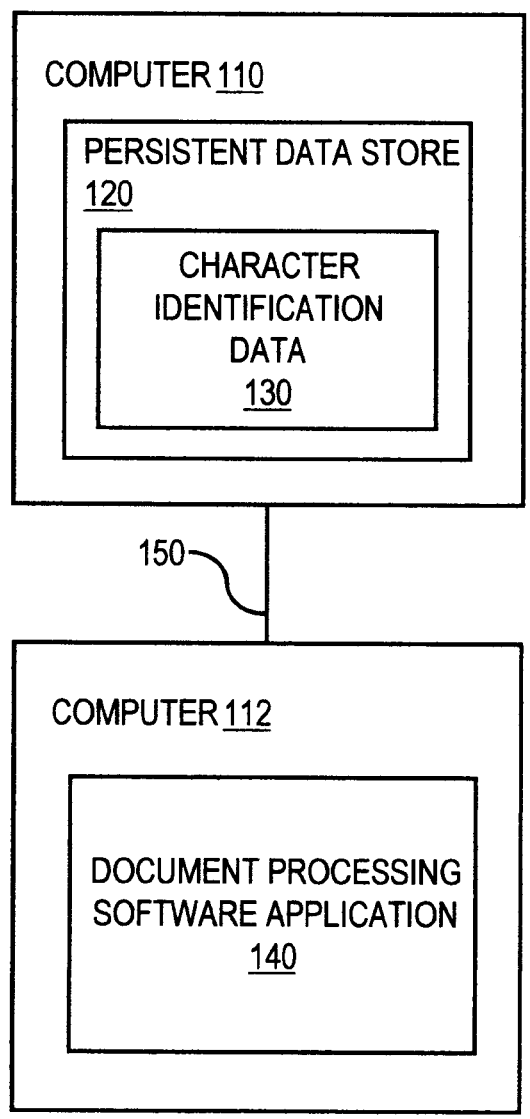
FIG. 1A is a block diagram of an illustrative system for enabling a computerized entity to recognize characters of an embedded font document according to one embodiment of the invention.

FIG. 1A is a block diagram of an illustrative system 100 according to one embodiment of the invention. System 100 includes computers 110 and 112 and communications link 150. System 100 may be used to enable a computerized entity to recognize characters of an embedded font document. For example, a user may use document processing software application 140 executing on computer 112 to process an electronic document. For example, document processing software application 140 may index or search an embedded font document. Using embodiments of the invention, if the embedded font document contains an embedded font which does not include code point data for characters recited within the embedded font document, then document processing software application 140 will nevertheless be able to ascertain the identity of the characters recited by the embedded font document.

Computers 110 and 112, as broadly used herein, refer to any machine which can execute software and store data. Non-limiting illustrative examples of computer 110 and 112 include a personal computer (PC), a laptop computer, a cell phone, a personal digital assistant (PDA), a tablet computer, and the like. In an embodiment, computers 110 and 112 may be implemented in a LAN or otherwise in the same network. In other embodiments, computers 110 and 112 may be maintained by different parties and may not be part of the same LAN, although the computers may be accessible to each other over communications link 150.

FIG. 1A depicts computer 112 executing document processing software application 140. Document processing software application 140, hereafter application 140, represents any software application which is capable of processing an embedded font document. A user may use application 140 to process or otherwise interact with an embedded font document which may, or may not, contain code point data for each character recited therein.

Computer 110 is shown by FIG. 1A as comprising persistent data store 120. Persistent data store 120, as broadly used herein, represents any mechanism for persistently storing digital data. For example, persistent data store 120 may be implemented using a database, a file system, or another other type of persistent storage medium.

Persistent data store 120 may store character identification data 130. Character identification data 130 is data that, for one or more characters of one or more fonts, associates (a) glyph data for a character with (b) code point data for the character, where the glyph data describes how to render the character on or to an output device, and the code point data identifies, to the machine, the identity of the character.

Figure 1B:
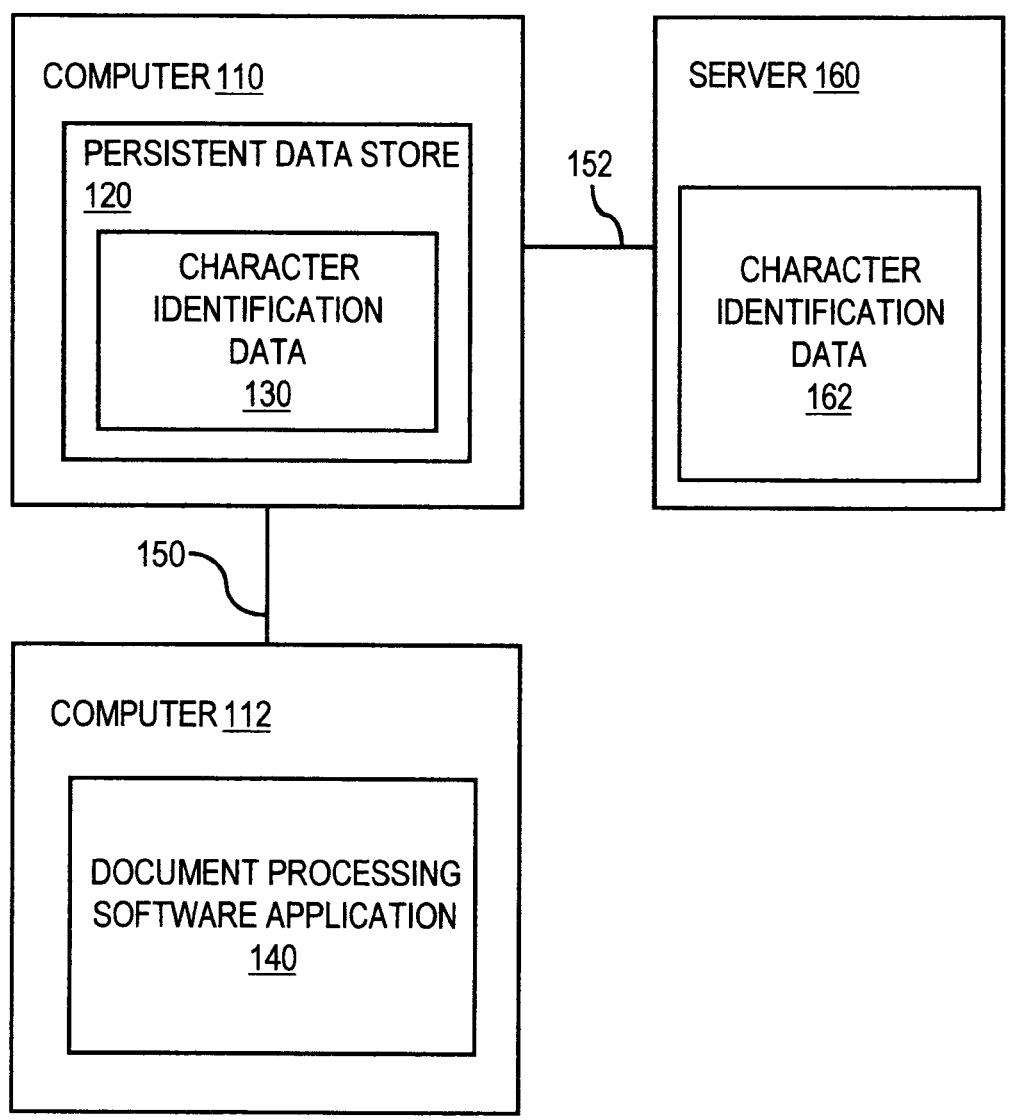
FIG. 1B is a block diagram of an illustrative system for enabling a computerized entity to recognize characters of an embedded font document according to another embodiment of the invention.
Figure 1C:
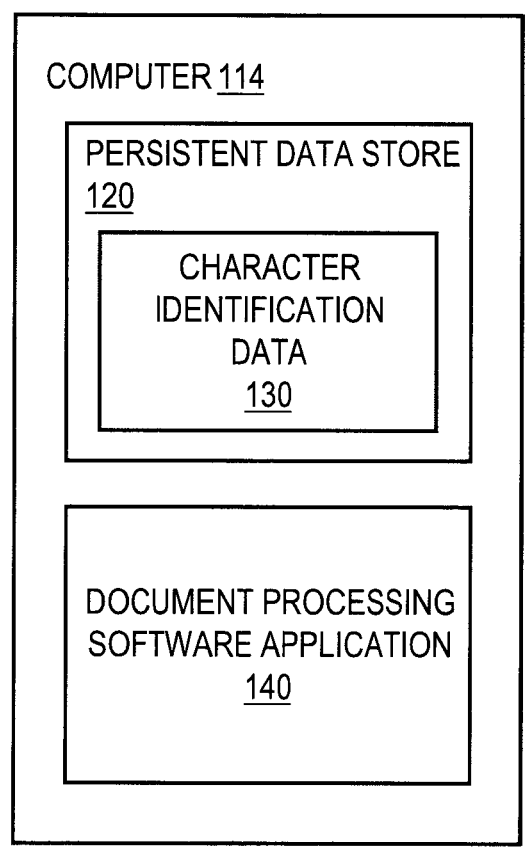
FIG. 1C is a block diagram of an illustrative system for enabling a computerized entity to recognize characters of an embedded font document according to another embodiment of the invention.

For purposes of providing a clear example, computers 110 and 112 are depicted in FIG. 1A as being separate entities; however, in other embodiments of the invention, such as the embodiment displayed in FIG. 1C, computer 110 and computer 112 may be implemented using the same computer or the same physical machine. In such an embodiment, (a) single computer 114 may execute application 140 and comprise persistent data store 120 that stores character identification data 130 and (b) communications link 150 need not be included in system 100.

Communications link 150 may be implemented by any medium or mechanism that provides for the exchange of data between server 130 and service provider application 110. Non-limiting, illustrative examples of communications link 150 include, without limitation, a network such as a Local Area Network (LAN), Wide Area Network (WAN), Ethernet or the Internet, one or more terrestrial, satellite or wireless links, and serial or parallel printer cables.

FIG. 1B illustrates system 170 which is similar to system 100 of FIG. 1A, except that system 170 further includes server 160. Server 160 is a computer which may be used to store a master set of character identification data 162. In an embodiment, character identification data 130 stored on computer 110 may be periodically updated with data from character identification data 162 over communications link 152. For example, server 160 may communicate with a plurality of different computers in system 100. Whenever one of the computers discovered an embedded font document which does not contain code point data, that computer may inform server 160 of the discovery. In turn, server 160 may update character identification data 162 to include an association between (a) glyph data for characters within the newly discovered embedded font document with (b) code point data for those characters. Thereafter, server 160 may communicate to other computers, such as computer 110, data which may be used to update character identification data 130, stored on computer 110, to include the association between (a) glyph data for characters within the newly discovered embedded font document with (b) code point data for those characters.

Having described the architecture of illustrative systems according to embodiments of the invention, the process of enabling a computerized entity to recognize a character recited by an embedded font document shall now be described according to an embodiment of the invention.

Enabling a Computer to Recognize a Character

FIG. 2 is a flowchart illustrating the steps of enabling a computerized entity to recognize characters of an embedded font document according to an embodiment of the invention. By performing the steps of FIG. 2, application 140 may recognize characters in an embedded font document and perform functions on the text of the embedded font document, such as indexing or searching, even if the embedded font documents lacks code point data for one or more characters recited therein.

In step 210, character identification data 130 is created. Step 210 may be performed by a variety of different entities prior to a user using application 140 to process an embedded font document. Also, as shall be explained below, character identification data 130 may be updated at different points in time to identity code point data for additional characters.

Embodiments of the invention may create character identification data 130 according to a variety of different approaches. According to one approach, a software process analyzes electronic fonts and/or one or more well-formed embedded font documents. A well-formed embedded font document is an embedded font document that contains both glyph data and code point data for each character recited therein. As used herein, glyph data is data that describes, to a machine, how to render a character on or to an output device and code point data is data that identifies, to a machine, the identity of a character. Note that the well-formed embedded font document may be specifically designed to include a large number of fonts to build the contents of character identification data 130, and need not be an electronic document that has any other use other than building character identification data 130. Alternately, the well-formed embedded font document need not be specifically designed, but rather, may correspond to one or more representative document(s) that have utility outside of building character identification data 130.

The software process may identify the glyph data for each character of the electronic font and/or the well-formed embedded font document(s). This may be done by the software process parsing the electronic font and/or well-formed embedded font document(s) according to a published standard associated with the particular type of embedded font document. For example, Adobe Corporation of San Jose, Calif. publishes a document entitled "PDF Reference Version 1.6, $5^{th}$ Edition" which describes the particular format of a PDF document. Using this published standard, a software process may parse through a PDF document to identify the glyph data and code point data contained therein or may extract the glyph data and code point data from an electronic font.

The software process may then use a hash function to hash the glyph data for a character to obtain a hash value for the character. The hash function may be implemented by any function which may be used to obtain a hash value for a set of glyph data. In an embodiment, the hash value may be a fixed size integer. The hash value obtained in this fashion for a particular character may then be associated with the code point data for that character and included as part of character identification data 130.

To illustrate, consider FIG. 3, which is a graphical depiction of character identification data 130 according to an embodiment of the invention. As shown by the embodiment depicted in FIG. 3, character identification data 130 may comprise a mapping of a hash value of the glyph data for a character to the code point data associated with the same character. Note that code point data is machine-readable data, but not necessarily easily readable, interpretable, or comprehensible by a human.

Each row of character identification data 130 associates a hash value with a set of code point data for a particular character of a particular font. For example, the hash value and code point data in row 310 may be associated with the character "a" of a Halloween-themed font, while the hash value and code point data in row 312 may be associated with the character "a" of a tax form font. Thus, character identification data 130 may distinguish between the same letter, number, and/or symbol in different fonts.

In identifying which embedded font documents should be analyzed to generate character identification data 130, a software process may provide a user interface that allows a user to identity one or more well-formed embedded font documents. After the well-formed embedded font documents have been identified, a software process may generate character identification data 130 as explained above by analyzing those documents. Alternatively or additionally, the software process creating character identification data 130 may analyze a corpus of embedded font documents pertaining to a particular topic of interest. Alternatively or additionally, the software process creating character identification data 130 may identify one or more well-formed embedded font documents to analyze by searching the Internet using a web crawling bot or a spider.

In another approach for creating character identification data 130, character identification data 130 may be updated using a human's input whenever an embedded font document is encountered which lacks code point data for a character. To illustrate, application 140 may read, scan, and/or parse a particular embedded font document, and thereafter determine that it does not contain code point data for one or more characters recited therein. Application 140 may then consult character identification data 130 to determine if character identification data 130 contains code point data for those characters. Upon application 140 determining that character identification data 130 does not include code point data for the character(s) which that application 140 cannot read, application 140 may prompt a user to identify the particular character for which glyph data, but not code point data, is available. Thereafter, application 140 may update character identification data 130 to include information that maps the character with the identity of the particular character as indicated by the user.

In step 220, character identification data 130 is stored in persistent data store 120. In an embodiment, persistent data store 120 may be accessible to application 140 over communications link 140. In an embodiment, character identification data 130 may be stored in persistent data store 120 as part of the installation of application 140. For example, character identification data 130 may be bundled with application 140 and sold as a unit. Thus, when a consumer purchases and installs application 140, the consumer may also install character identification data 130 in a location of their choosing. Alternately, during the installation of application 140, application 140 may be configured with the location of persistent data store 120, which may be maintained by a different party or owner than the party maintaining or owning application 140.

Character identification data 130, once stored in persistent data store 120, may be periodically updated to include information about additional characters of one or more fonts. To illustrate, in system 170 of FIG. 1B, server 160 stores character identification data 162. Character identification data 162 may be a superset of character identification data. For example, character identification data 162 may be updated by a third party (such as the provider of application 140), and periodically the third party maintaining character identification data 162 may cause character identification data 130 to be updated to reflect the new information stored in character identification data 162.

In step 230, character identification data 130 is consulted by application 140 to determine the identity of one or more characters recited by the embedded font document. Step 230 may be performed in response to application 140 determining that the embedded font document is not a well-formed embedded font document (i.e., the embedded font document does not include a set of code point data for one or more characters).

In an embodiment, application 140 may use the hash function to hash the glyph data for each character recited by the embedded font document for which the embedded font document does not include code point data. In this way, application 140 may obtain a hash value for each character which application 140 cannot read. Thereafter, application 140 may communicate with computer 110 to consult with character identification data 130. Application 140 may then use the hash value for each character to identify, within character identification data 130, a set of code point data for the particular character. For example, if application 140 obtained a hash value equal to hash value 2 as shown by the illustrative character identification data 130 depicted in FIG. 3, then by performing step 230, application 140 may obtain code point data 2 for the character which application 140 could not previously read.

As an further illustrative example, if application 140 is attempting to search a corpus of foreign language documents to construct an index to words recited by each document, and if a particular embedded font document in the corpus does not contain code point data for certain characters, then application 140 may contact persistent data store 120 and attempt to look up or otherwise retrieve the relevant code point data for the characters recited by the embedded font document from character identification data 130.

IMPLEMENTING MECHANISMS

Figure 4:
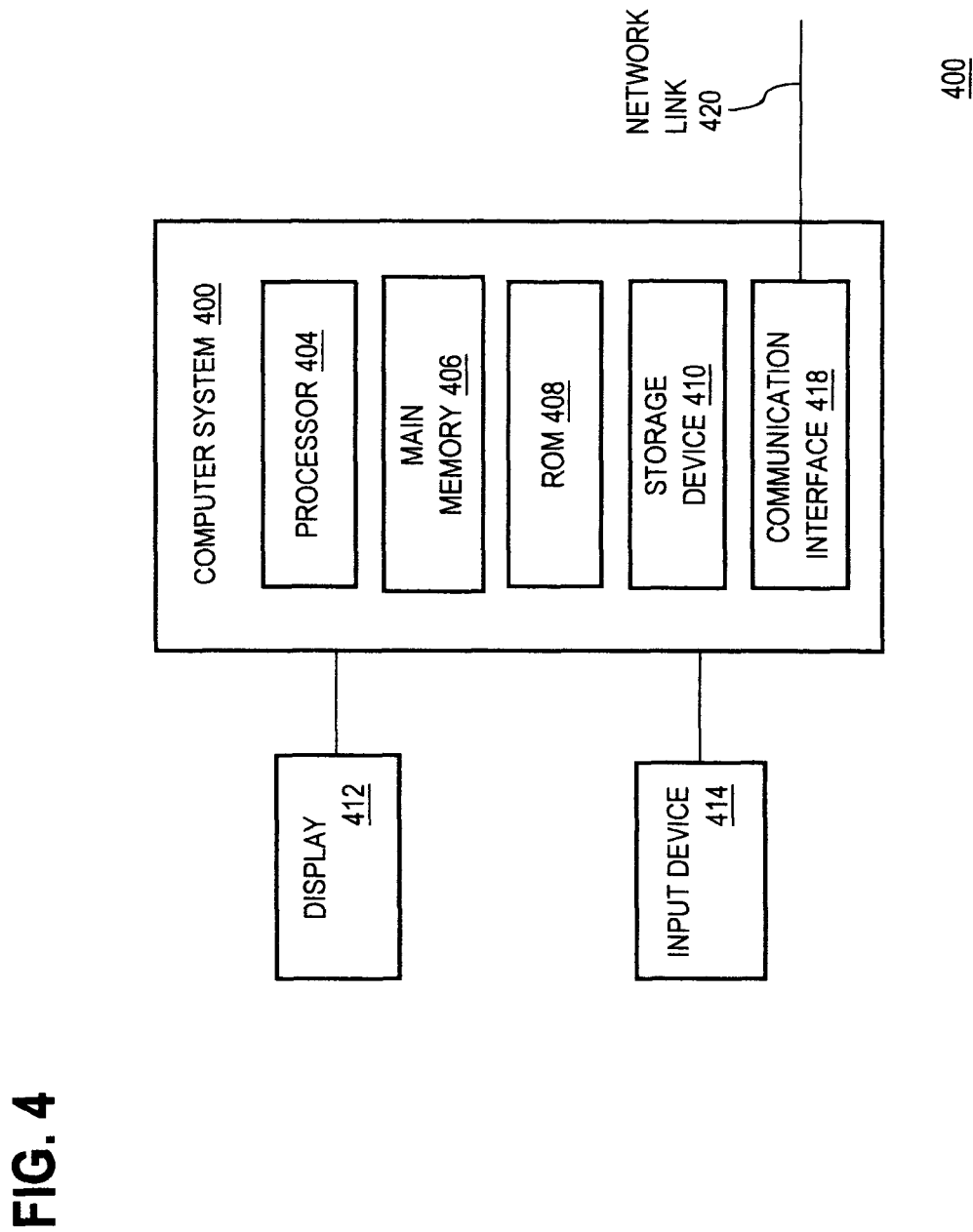
FIG. 4 is a block diagram that illustrates a computer system upon which an embodiment of the invention may be implemented.

In an embodiment, one or more of computer 110, computer 112, and server 160 may be implemented on or using a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other nonlimiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage media storing one or more sequences of instructions executable by one or more processors to process electronic documents, which when executed by the one or more processors, cause:
   parsing a well-formed embedded font document, using a predetermined standard associated with a particular type of embedded font document, to identify glyph data and code point data contained in the well-formed embedded font document;
   wherein the well-formed embedded font document is an embedded font document that contains both glyph data and code point data for each character recited therein;
   wherein the glyph data describes how to render a character on or to an output device;
   wherein the code point data identifies an identity of the character;
   storing, in a persistent data store, character identification data that, for multiple fonts, associates in corresponding multiple rows: (a) at least said glyph data for the character with (b) at least said code point data for the character;
   scanning a particular embedded font document that is not well formed, to determine that the particular embedded font document does not contain code point data for one or more characters recited therein;
   upon determining that the particular embedded font document does not include the code point data for a particular character, consulting the character identification data stored by said storing, to determine the identity of the particular character; and
   using the identity of the particular character obtained by the consulting, in indexing or searching text of the particular embedded font document.

2. The one or more non-transitory machine-readable storage media of claim 1, wherein consulting the character identification data comprises:
   using a hash function to hash the glyph data for the particular character to obtain a hash value; and
   using the hash value to identify, within the character identification data, a set of code point data for the particular character.

3. The one or more non-transitory machine-readable storage media of claim 1, wherein consulting the character identification data comprises:
   upon determining that the character identification data does not include a set of code point data for the particular character, (a) prompting a user to identify the particular character, and (b) updating the character identification data to associate the particular character with the identity of the particular character indicated by the user.

4. The one or more non-transitory machine-readable storage media of claim 1, further comprising:
   creating the character identification data by providing an interface to enable a user to identify one or more electronic documents that include both glyph data and code point data for a plurality of characters.

5. The one or more non-transitory machine-readable storage media of claim 1, wherein the character identification data is periodically updated to include additional information that associates glyph data with code point data.

6. The one or more non-transitory machine-readable storage media of claim 1, wherein the embedded font document is a PDF document that conforms to the Portable Document Format.

7. The one or more non-transitory machine-readable storage media of claim 1, wherein rendering the character on or to an output device includes (a) printing the character to a printing device or (b) visually depicting the character on a display.

8. A method for enabling a machine to recognize characters in electronic documents, the method comprising:
   parsing a well-formed embedded font document, using a predetermined standard associated with a particular type of embedded font document, to identify glyph data and code point data contained in the well-formed embedded font document;
   wherein the well-formed embedded font document is an embedded font document that contains both glyph data and code point data for each character recited therein;
   wherein the glyph data describes how to render a character on or to an output device;
   wherein the code point data identifies an identity of the character;
   storing, in a persistent data store, character identification data that, for multiple fonts, associates in corresponding multiple rows: (a) at least said glyph data for the character with (b) at least said code point data for the character;
   scanning a particular embedded font document that is not well formed, to determine that the particular embedded font document does not contain code point data for one or more characters recited therein;
   upon determining that the particular embedded font document does not include the code point data for a particular character, consulting the character identification data stored by said storing, to determine the identity of the particular character; and
   using the identity of the particular character obtained by the consulting, in indexing or searching text of the particular embedded font document.

9. The method of claim 8, wherein consulting the character identification data comprises:
   using a hash function to hash the glyph data for the particular character to obtain a hash value; and
   using the hash value to identify, within the character identification data, a set of code point data for the particular character.

10. The method of claim 8, wherein consulting the character identification data comprises:
    upon determining that the character identification data does not include a set of code point data for the particular character, (a) prompting a user to identify the particular character, and (b) updating the character identification data to associate the particular character with the identity of the particular character indicated by the user.

11. The method of claim 8 further comprising: creating the character identification data by providing an interface to enable a user to identify one or more electronic documents that include both glyph data and code point data for a plurality of characters.

12. The method of claim 8, wherein the character identification data is periodically updated to include additional information that associates glyph data with code point data.

13. The method of claim 8, wherein the embedded font document is a PDF document that conforms to the Portable Document Format.

14. The method of claim 8, wherein rendering the character on or to an output device includes (a) printing the character to a printing device or (b) visually depicting the character on a display.

15. An apparatus for enabling a machine to recognize characters in an electronic document, comprising:
   one or more processors; and
   a machine-readable medium storing one or more sequences of instructions, which when executed by the one or more processors, cause:
   parsing a well-formed embedded font document, using a predetermined standard associated with a particular type of embedded font document, to identify glyph data and code point data contained in the well-formed embedded font document;
   wherein the well-formed embedded font document is an embedded font document that contains both glyph data and code point data for each character recited therein;
   wherein the glyph data describes how to render a character on or to an output device;
   wherein the code point data identifies an identity of the character;
   storing, in a persistent data store, character identification data that, for multiple fonts, associates in corresponding multiple rows: (a) at least said glyph data for the character with (b) at least said code point data for the character;
   scanning a particular embedded font document that is not well formed, to determine that the particular embedded font document does not contain code point data for one or more characters recited therein;
   upon determining that the particular embedded font document does not include a set of the code point data for a particular character, consulting the character identification data stored by said storing, to determine the identity of the particular character; and
   using the identity of the particular character obtained by the consulting, in indexing or searching text of the particular embedded font document.

16. The apparatus of claim 15, wherein consulting the character identification data comprises:
   using a hash function to hash the glyph data for the particular character to obtain a hash value; and
   using the hash value to identify, within the character identification data, a set of code point data for the particular character.

17. The apparatus of claim 15, wherein consulting the character identification data comprises:
   upon determining that the character identification data does not include a set of code point data for the particular character, (a) prompting a user to identify the particular character, and (b) updating the character identification data to associate the particular character with the identity of the particular character indicated by the user.

18. The apparatus of claim 15, wherein execution of the one or more sequences of instructions by the one or more processors further causes:
   creating the character identification data by providing an interface to enable a user to identify one or more electronic documents that include both glyph data and code point data for a plurality of characters.

19. The apparatus of claim 15, wherein the character identification data is periodically updated to include additional information that associates glyph data with code point data.

20. The apparatus of claim 15, wherein the embedded font document is a PDF document that conforms to the Portable Document Format.

21. The apparatus of claim 15, wherein rendering the character on or to an output device includes (a) printing the character to a printing device or (b) visually depicting the character on a display.

* * * * *

UNITED STATES PATENT AND TRADEMARK OFFICE
CERTIFICATE OF CORRECTION

PATENT NO. : 8,494,287 B2  
APPLICATION NO. : 12/698650  
DATED : July 23, 2013  
INVENTOR(S) : Boutros et al.

Page 1 of 1

It is certified that error appears in the above-identified patent and that said Letters Patent is hereby corrected as shown below:

In the Claims

In column 12, line 2, delete "include a set of the" and insert -- include the --, therefor.

Signed and Sealed this  
Twelfth Day of November, 2013

Teresa Stanek Rea  
*Deputy Director of the United States Patent and Trademark Office*